(No Model.)

C. C. READ.
BERRY PICKER.

No. 485,057. Patented Oct. 25, 1892.

Witnesses
Jas. K. McCathran
L. P. Nothaupt

Inventor
Charles C. Read
By his Attorneys,
C. A. Snow & Co.

UNITED STATES PATENT OFFICE.

CHARLES C. READ, OF MANDARIN, FLORIDA.

BERRY-PICKER.

SPECIFICATION forming part of Letters Patent No. 485,057, dated October 25, 1892.

Application filed November 9, 1891. Serial No. 411,317. (No model.)

*To all whom it may concern:*

Be it known that I, CHARLES C. READ, a citizen of the United States, residing at Mandarin, in the county of Duval and State of Florida, have invented a new and useful Berry-Picker, of which the following is a specification.

This invention relates to fruit-pickers; and it has for its object to provide cutting-shears so made as to adapt themselves to fit the hand and so constructed that the fruit or flowers to be cut can be held and cut by the use of one hand, leaving the other free to receive the same, the article being particularly designed for use in clipping oranges; but may be also advantageously employed in cutting fruit, flowers, &c.

With these and other objects in view, which will readily appear as the nature of the invention is better understood, the same consists in the novel construction of cutting-shears hereinafter more fully described, illustrated, and claimed.

Figure 1:
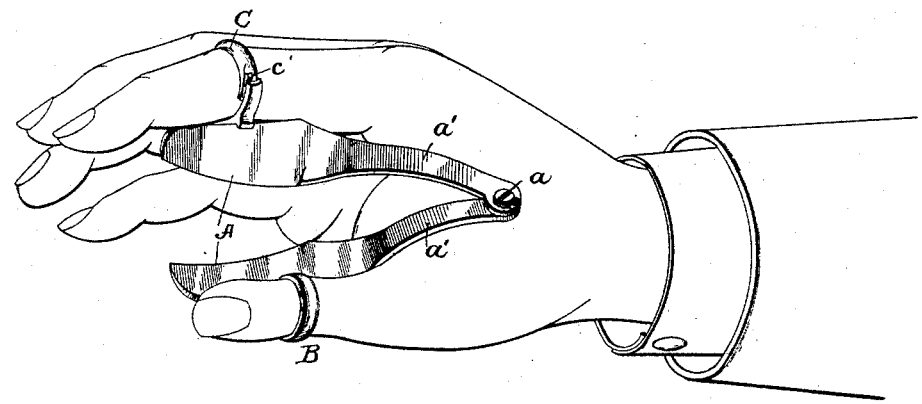
Figure 2:
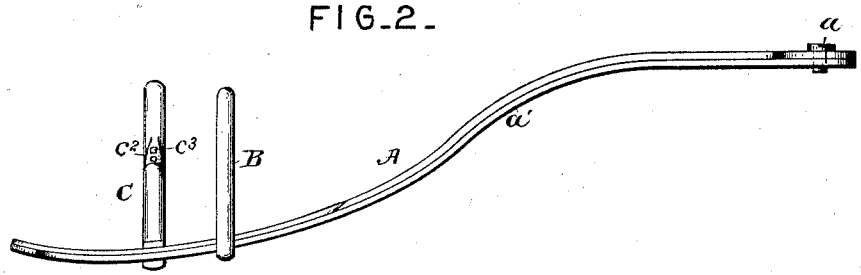
Figure 3:
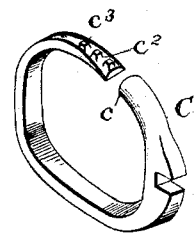
Figure 4:
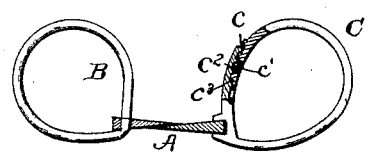

In the accompanying drawings, Figure 1 is a perspective view of my improved fruit-picker as held for use by the hand of the operator. Fig. 2 is an edge view of my improved clippers. Fig. 3 is a detail in perspective of the adjustable forefinger-ring. Fig. 4 is a transverse section through the shears.

Referring to the accompanying drawings, A represents the blades of my improved shears, which are pivoted at $a$ at their extreme inner ends, the cutting portions of said blades being enlarged and concaved in order that the same may work snugly over each other and provide an accurate cutting-edge, while the shanks $a'$ of said blades extend rearwardly from the enlarged portions thereof and are gently curved upward from the same in order to allow said shank portions to extend back a considerable distance from the blades, and thus permit the riveted ends of the blades to rest over and secure a purchase upon the portion of the hand directly behind the crotch between the forefinger and thumb, and thus steady the device between the fingers and prevent the same from slipping out of place while cutting, while the said enlarged concaved cutting portions of the blades, on account of the curvature of the shanks thereof, lie directly between the forefinger and thumb of the operator. Securely connected to one of said blades is a continuous thumb-ring B, that is designed to fit over the thumb of the operator, while to the opposite blade of the shears is rigidly attached the adjustable forefinger-ring C, which is rendered adjustable to fit the various sizes of forefingers. The said ring C is made of spring metal and is provided at one end with an inner groove $c$, having therein a series of notches or teeth $c'$, while the opposing end of the ring, which normally springs away from the grooved end, as seen in Fig. 3, is provided with a raised tongue $c^2$, also provided with a series of notches or teeth $c^3$, that are adapted to adjustably engage the notches in the groove of the opposing end of said ring when such tongued end is sprung into said grooved end, and thus render the said ring adjustable to increase or reduce the size thereof, said fastening device being located upon the inner side of the finger, so as not to interfere with the movement of the shears.

The construction, operation, and advantages of the herein-described fruit pickers or shears is now thought to be apparent without further description.

Having thus described my invention, what I claim, and desire to secure by Letters Patent, is—

In a fruit-picker, the combination of the blades pivoted together at their inner ends and having a rearwardly-extending curved shank resting upon the back of the hand, a continuous ring secured to one of said blades and adapted to receive the thumb, and an adjustable forefinger-ring secured to the opposite blade and provided at one end thereof with a groove having a series of notches or teeth and at the opposite or opposing end with a raised tongue having a series of notches or teeth adapted to be sprung into and adjustably engage the notches or teeth in said grooved end, substantially set forth.

In testimony that I claim the foregoing as my own I have hereto affixed my signature in the presence of two witnesses.

CHARLES C. READ.

Witnesses:
P. D. CASSIDEY,
N. A. HULL, Jr.